United States Patent [19]
Someya et al.

[11] Patent Number: 4,673,277
[45] Date of Patent: Jun. 16, 1987

[54] MULTI-PROGRAM CONTROL DEVICE FOR CAMERA

[75] Inventors: Hiromi Someya, Kanagawa; Yoshihiko Aihara, Tokyo; Toyokazu Mizogui, Kanagawa; Nobuyuki Suzuki, Kanagawa, all of Japan

[73] Assignee: Canon Kabushiki Kaisha, Tokyo, Japan

[21] Appl. No.: 820,873

[22] Filed: Jan. 16, 1986

Related U.S. Application Data

[63] Continuation of Ser. No. 559,220, Dec. 8, 1983, abandoned.

[30] Foreign Application Priority Data

Dec. 9, 1982 [JP] Japan ................... 57-216333
Dec. 9, 1982 [JP] Japan ................... 57-216334

[51] Int. Cl.$^4$ .................. G03B 17/18; G03B 7/08
[52] U.S. Cl. .................. 354/474; 354/442
[58] Field of Search .......... 354/442, 441, 465, 471, 354/474, 475, 289.1, 289.12

[56] References Cited

U.S. PATENT DOCUMENTS

| 4,468,109 | 8/1984 | Maida ................... 354/442 |
| 4,529,291 | 7/1985 | Mizogui ................. 354/289.1 |
| 4,536,074 | 8/1985 | Someya et al. .......... 354/442 |

FOREIGN PATENT DOCUMENTS 57-78033  5/1982  Japan .................. 354/474

Primary Examiner—L. T. Hix
Assistant Examiner—David M. Gray
Attorney, Agent, or Firm—Toren, McGeady & Associates

[57] ABSTRACT

A multi-program control camera permitting selection of various exposure control modes is provided with a display arrangement to indicate, by pictographs and/or letters, the effects of a picture image obtainable by selection of the exposure control modes; and to automatically shift a selected exposure control mode to another mode when the effect of the picture image expected is difficult to obtain by the mode selected on the basis of at least one of the information values including the maximum aperture value of a lens, the minimum aperture value thereof, a fixed aperture, a focal length and the brightness of an object to be photographed.

13 Claims, 12 Drawing Figures

MULTI-PROGRAM CONTROL DEVICE FOR CAMERA

This is a continuation of application Ser. No. 559,220, filed Dec. 8, 1983, now abandoned.

BACKGROUND OF THE INVENTION

1. Field of the Invention

This invention relates to a camera multi-program control device which indicates an apposite program according to the aperture value and the focal length of a lens or changes an inapposite program to an apposite program.

2. Description of the Prior Art

Multi-mode automatic exposure control cameras of the kind permitting selection of various exposure control modes such as a shutter speed preference mode, an aperture preference mode and a programed mode have been in use. In cameras of this kind, letters or marks have generally been used for indicating the exposure control modes selected at an operation part or within a view finder. However, such letters and marks are inconvenient, particularly for beginners who are unable to select an apposite aperture value or a shutter time value for obtaining a picture image effect depending on the depth of focus or the difference in shutter time or who do not know the interrelation of the aperture value, shutter time, film sensitivity and brightness of the object to be photographed since they can hardly understand the relation of an obtainable picture image effect to the aperture value or shutter time value. The indication of a selected mode with a mere letter or mark does not readily inform the user of a combination of shutter time and an aperture value required for a desired effect on the picture to be taken. Besides, in some lenses, aperture values such as a maximum aperture F-number, a minimum aperture or a fixed aperture are limited and they differ in focal length. Therefore, the kinds of lenses capable of giving a certain picture image effect is limited. The arrangement of the prior art thus has been not only difficult for beginners to understand but has also limited the possible range of photography operations.

It is an object ot the present invention to provide a multi-program control camera which permits selection of various exposure control modes and gives a warning when a desired picture image effect is hardly obtainable by the selected exposure control mode so that an apposite exposure control mode can be selected without difficulty to eliminate the above shortcoming of the prior art arrangement.

It is another object of the invention to provide a multi-program control camera which permits selection of various exposure control modes and which automatically shifts a selected exposure control mode to an apposite exposure control mode when a desired picture image effect is hardly obtainable by the selected mode, so that a standardized photograph can be taken without fail.

These and further objects and features of the invention will become apparent from the following detailed description of preferred embodiments thereof taken in connection with the accompanying drawings.

SUMMARY OF THE INVENTION

A camera capable of selecting an exposure control mode from a plurality of exposure control modes, includes display means for displaying an exposure control mode selected. The display means is arranged to indicate, by pictographs and letters or the like, effects on the picture image derivable from the exposure control modes. The camera also includes signal generating means for generating an electrical signal in accordance with photographing information and determining means for determining whether the picture image effect to be derived from the selected exposure control mode is obtainable, on the basis of the electrical signal from the signal generating means. The camera also includes a display control means for controlling the display action of the display means on the basis of the output of the determining means. The display control means is arranged to vary the displaying state of the display means when the determining means determines that the specific picture image effect is not obtainable.

DETAILED DESCRIPTION OF THE PREFERRED EMBODIMENTS

Figure 1:
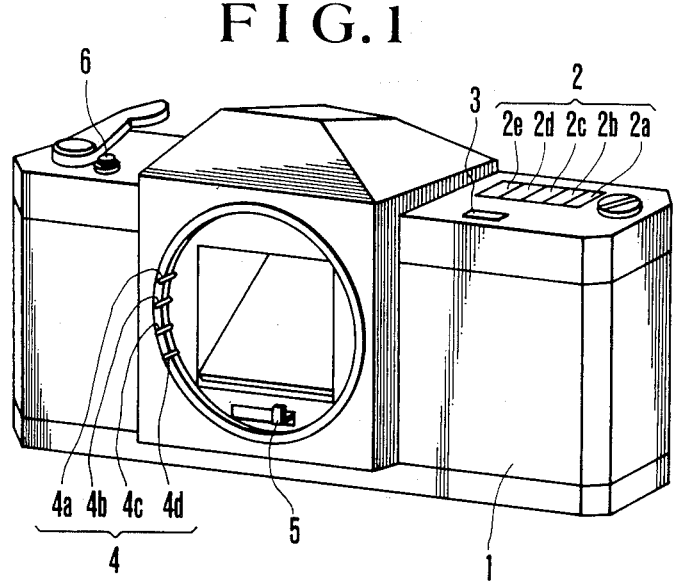
FIG. 1 is a perspective view showing the appearance of a camera and a lens as an embodiment of the present invention.
Figure 1:
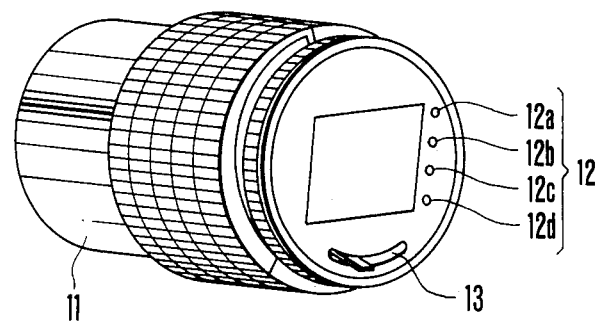

FIG. 1 shows a multi-program camera having a mode display arrangement and also shows a lens which is capable of transmitting information on a maximum F-number, a minimum aperture or focal length thereof to the camera, when the lens is mounted on the camera. The camera includes a camera body 1; an exposure control mode display part 2 consisting of liquid crystal or the like; an exposure control mode selection switch 3 for shifting from one exposure control mode to another; connector terminals 4 for electrical connection; an automatic stop-down lever 5 transmits a computed aperture value to the lens; a shutter release button 6; a lens body 11; signal terminals 12 electrically connected to the connector terminals 4 to transmit information on the maximum F-number, minimum aperture, fixed aperture and focal length of the lens to the camera when the lens is mounted on the camera body 1; and an aperture setting lever 13 which engages the automatic stop-down lever 5 for setting an aperture value when the lens is mounted on the camera body.

Figure 2:
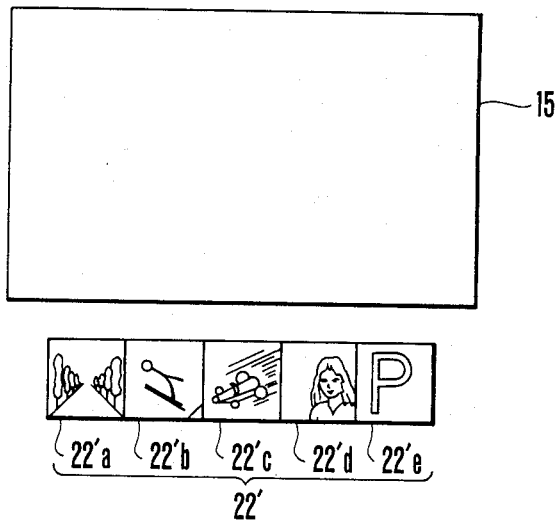
FIG. 2 is an illustration showing all the mode displays to be made in the visual field of a view finder.

The view finder visual field of the camera of FIG. 1 is as shown in FIG. 2. The visual field includes a display part 22' which corresponds to the above exposure control mode display part 2 consisting of sections 2a, 2b, 2c, 2d and 2e. The part 22' consists of a pictograph display 22'a depictive of an aperture preference mode in which the aperture of the lens is stopped down to increase the focus depth (hereinafter called the pan-focus mode); a pictograph display 22'b depictive of a shutter preference mode in which the shutter is operated at a high speed (hereinafter called the stop motion mode); a pictograph display 22'c depictive of a shutter preference mode in which the shutter is operated at a low speed for panning (hereinafter called the panning shot mode); a pictograph display 22'd depictive of an aperture preference mode in which an aperture value closer to the maximum aperture is used for a shallow focal depth (hereinafter called the graded mode); and a display symbol 22'e representative of a standard programmed mode in which an aperture value frequently selected in general is used in combination with an apposite shutter speed (hereinafter called the normal program mode).

Figure 3:
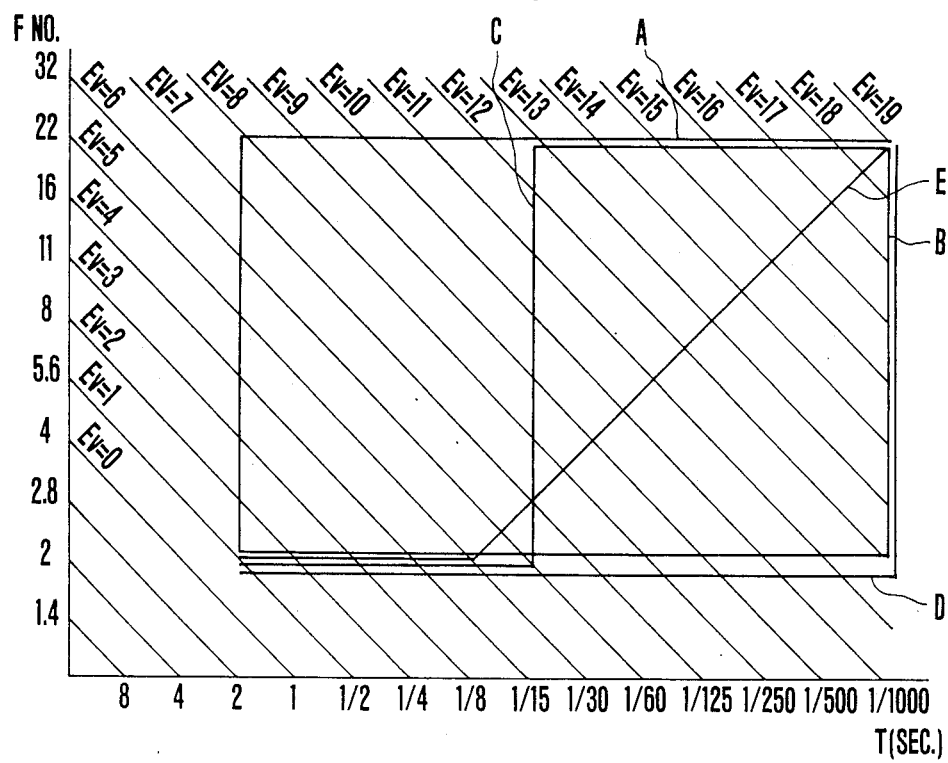
FIG. 3 is a graph showing the program lines of the camera shown in FIG. 1.

FIG. 3 shows program lines of the multi-program control camera shown in FIG. 1. FIG. 3 is applicable to the use of lenses of a maximum F-number not exceeding F=2 and a minimum aperture value above F=22. In the graph of FIG. 3, the axis of ordinate indicates aperture values (F-No.) and the axis of abscissa shutter time (T). The scalene axes indicate exposure values EV (Lv values at ASA 100). A reference symbol A identifies the pan-focus mode in which the shutter time is T=2 within a range of exposure values EV=1-8 and the aperture value is F=2-22; and the shutter time is T=2-1/1000 and the aperture value F=22 within a range of EV=-8-19. A symbol B identifies the stop motion mode in which the shutter time is T=2-1/1000 and the aperture value F=2 within a range of exposure values EV=-1-12; and the shutter time is 1/1000 and the aperture value F=2-22 within a range of exposure values EV=-12-19. A symbol C identifies the panning shot mode in which the shutter time is T=2-1/15 and the aperture value F=2 within a range of exposure values EV=1-6; the shutter time is T=1/15 and the aperture value F=2-22 within a range of exposure values EV=6-13; and the shutter time is T=1/15-1/1000 and the aperture value F=22 within a range of exposure values EV=13-19. A symbol D identifies the graded mode in which the graphic representation of the program is similar to that of the stop motion mode B. A symbol E identifies the normal program mode in which the aperture value is F=2 and unvarying within a range of the shutter time T=2-1/8 (EV=1-5); and, on the high brightness side, the combinations of the aperture values and the shutter time values are on a line connecting a point of an aperture value F=22 and a shutter time value T=1/1000 to a point of an aperture value F=2 and a shutter time value T=1/8.

Figure 4:
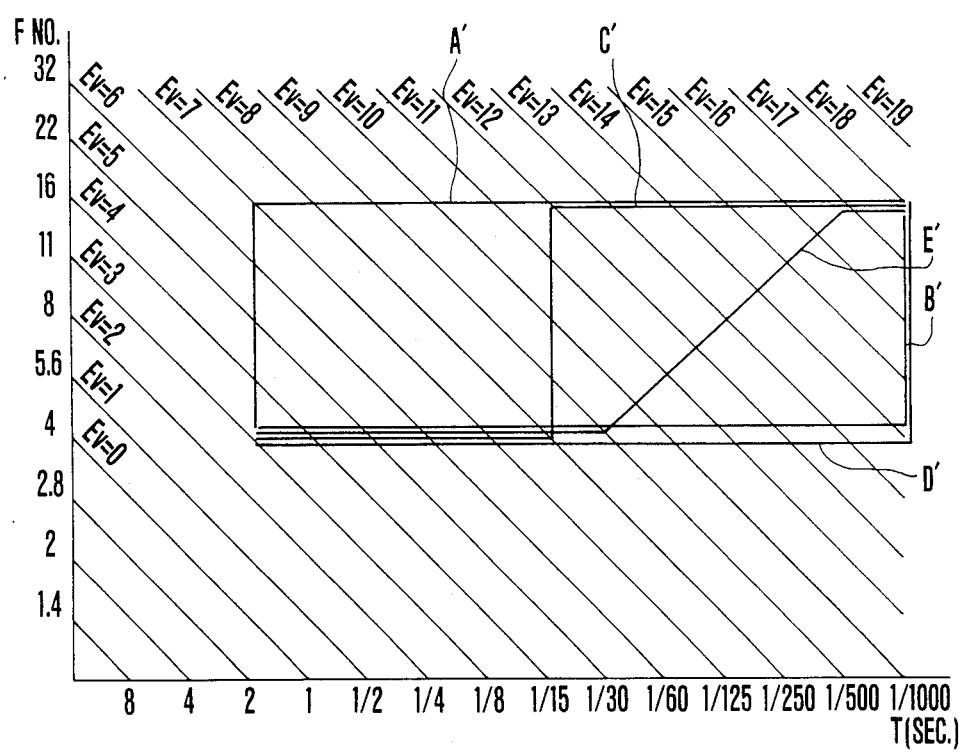
FIG. 4 is a graph showing program lines applicable to a situation where a lens which does not fit in the programmed range of FIG. 3 is mounted on the camera.

FIG. 4 is another graph showing program lines applicable to the use of lenses of a maximum F-number and a minimum aperture which do not fit in the above program range. In the specific example shown in FIG. 4, a lens of a maximum aperture of F-number F=4 and a minimum aperture of F=16 is mounted on the camera. A reference symbol A' identifies the pan-focus mode in which, when the exposure exceeds the range from the maximum aperture to the minimum aperture at a shutter time value T=2, the shutter time becomes T=1-1/1000 at the minimum aperture. A reference symbol B' identifies the stop motion mode in which, when the exposure exceeds the shutter time T=2-1/1000 at the maximum aperture, the aperture value changes within the range from the maximum aperture to the minimum aperture at the shutter time T=1/1000. A symbol C' identifies the panning shot mode in which, when the exposure exceeds a range of shutter time T=2-1/15 at the maximum aperture, the aperture changes within the range from the maximum aperture to the minimum aperture at the shutter time T=1/15. Then, when the exposure further exceeds that range, the shutter time changes within a range T=1/15-1/1000 at the minimum aperture. A symbol D' identifies the graded mode, the program of which is similar to that of the stop motion mode B'. A symbol E' identifies the normal program mode in which, when the exposure is dark, the shutter time is within a range from T=2 up to the intersection point of the program line E of FIG. 3 at the maximum aperture and, when the exposure further exceeds that range, the program is similar to that of the program line E. When the exposure is brighter than the intersection point with the minimum aperture, the shutter time changes up to T=1/1000 at the minimum aperture. However, any combinations between the shutter time and the aperture values that can give various picture image effects are programmed within the following ranges in accordance with the present invention:

Pan-focus mode: Aperture value F=22 and shutter time T=1/15 and above.

Stop motion mode: Shutter time T=1/500-1/1000 and aperture from maximum value to minimum value.

Panning shot: Shutter time T=1/8-1/30 and aperture value from maximum to minimum.

Graded mode: Aperture value F=2-2.8 and shutter time T=1/15 and above.

Normal program mode: No limitation.

For cameras designed for use by beginners, the shutter time is higher than 1/15.

With the camera programmed in the manner described above, when a lens of a maximum aperture F=2 and minimum aperture F=22 having a focal length of about 50 mm is mounted on the camera using a film with the sensitivity ASA 100, the camera operates as follows: When the main switch (not shown) is turned on, the pictograph displays 2e and 22'e respectively appear at the exposure control mode display part 2 and the view finder display part 22'. Then, when the exposure control mode selection button 3 is pushed once, the pictograph displays 2a and 22'a appear at the exposure control mode display part 2 and the view finder display part 22' respectively and the pictograph displays 2e and 22'e disappear. This indicates a shift from the normal program mode to the pan-focus mode. Then, when the exposure control mode selection button 3 is again pushed, the pictograph displays 2a l and 22'a disappear and pictograph displays 2b and 22'b appear to indicate a shift from the pan-focus mode to the stop motion mode. With the exposure control mode selection button 3 pushed further in this manner, the panning shot mode, the graded mode and the normal program mode displays appear, one after another, and the exposure control mode is shifted accordingly. Furthermore, if the exposure control mode selection button 3 is continuously pushed, the exposure control mode, the exposure control mode display and the view finder display accordingly shift respectively from one mode to another.

Figure 5:
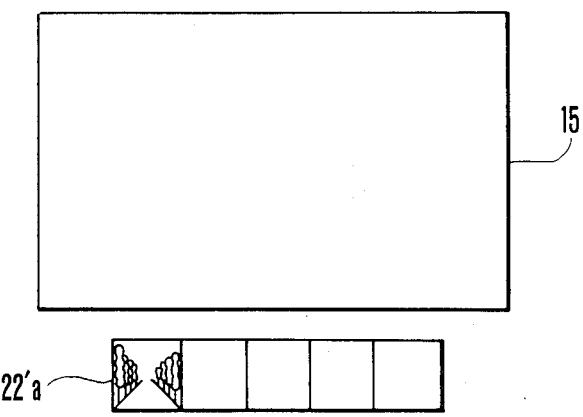
FIG. 5 is an illustration showing the view finder visual field of the camera of FIG. 1 having been set in a pan-focus mode.
Figure 6:
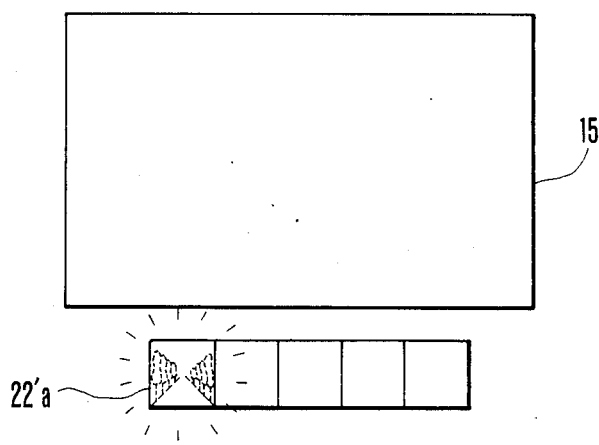
FIG. 6 is an illustration showing the same view finder visual field where the photographing condition is not suitable for obtaining the pan-focus effect.

Photography in the pan-focus mode is as follows: The control circuit is set for the pan-focus mode with the exposure control mode selection button 3 pushed. In this instance, the pictograph 22'a is displayed at the view finder display part 22', as shown in FIG. 5. If the brightness of the object to be photographed is EV=16, the aperture value is set at F=22 and the shutter time at T=1/250. When the shutter release button 6, shown in FIG. 1, is depressed under this condition, the shutter is released giving an apposite exposure and eventually gives a picture having a pan-focus effect. However, if the lens is replaced with a lens of a minimum aperture F=16 and a focal length of about 50 mm, the above picture image effect is no longer obtainable. Then, the pan-focus mode is shifted to the normal program mode for carrying out photography in a standard manner. And the normal program mode displays 2e of FIG. 1 and 22'e of FIG. 2 flicker. Furthermore, if the brightness of the object is lower than EV=12, the photographing condition also deviates from the obtainable range of the pan-focus effect. Therefore, the camera shifts from the pan-focus mode to the normal program mode. Then, the normal displays 2e of FIG. 1 and 22'e of FIG. 2 flicker informing the photographer of this shift. This display arrangement may be replaced with some other suitable display within or outside of the view finder.

The operation in the graded mode is as follows: The above exposure control mode button 3 is operated to obtain the graded mode. The displays 2d and 22'd are respectively displayed at the exposure control mode display part 2 and the view finder display part 22' indicating the shift to the graded mode. In the event that the brightness of the object is EV=10, the shutter time is set at T=1/250 (sec.) and the aperture at F=2. Shutter release under this condition gives an apposite exposure and a resultant picture with a graded effect. However, if the maximum aperture or F-number of the lens mounted on the camera is F=4, the aperture is set at the value F=4 and the shutter time at T=1/60. This condition deviates from the range within which the above picture image effect is obtainable. In this instance, therefore, the lens is unsuited for obtaining a graded picture effect and the program line D is shifted to the line E for the standard photography mode. Then, the normal program mode displays 2e of FIG. 1 and 22'e of FIG. 2 also flicker informing the photographer of the shift to the normal program mode in the same manner as with the pan-focus mode.

Using the stop motion mode or the panning shot mode in which the exposure control is carried out with preference given to the shutter time, the operation is as follows: With the exposure control mode selection button 3 selecting the stop motion mode or the panning shot mode, the exposure control mode display 2b or 2c and the view finder display 22'b or 22'c are respectively displayed indicating that the camera is set for the mode selected.

However, in this situation, it is impossible to carry out automatic control in the shutter time preference manner if the lens mounted on the camera is of a fixed aperture, such as with a mirror lens. In that instance, the exposure control mode display 2b or 2c and the view finder display 22'b or 22'c flicker informing the photographer that automatic exposure control is impossible.

Furthermore, if photography is to be carried out in an aperture preference manner as with the pan-focus mode or the graded mode with a lens of fixed aperture mounted on the camera, the exposure control mode is also shifted to the normal program mode in the same manner as described above, if the fixed aperture value is unsuitable for a pan-focus effect or a graded effect. In that event, the normal program mode displays 2e of FIG. 1 and 22'e of FIG. 2 also flicker informing the photographer of the shift to the normal program mode.

Furthermore, if the picture image effect derived from a selected mode is not obtainable, the selected mode display 2b or 2c and the view finder display 22'b or 22'c may flicker.

The aperture and shutter time values programed in the exposure control modes for obtaining various picture image effects do not always insure that the desired effects are 100 percent attainable. In this specific embodiment, the maximum of full open aperture is set at F=2 and the minimum aperture at F=22. If the photographer is a beginner, it is difficult to understand differences in the condition of the object to be photographed and the focal length of the lens in use and, accordingly, to select the most suitable aperture value and shutter time. In view of this, it is necessary to minimize photography failure for many objects by combinations of the aperture values and shutter time values that more readily give the desired picture effects. Furthermore, it is necessary to have focal length information because picture effects vary according to lens focal length differences. The hyper-focal distance of a lens can be expressed by the following approximate expression:

$$H \approx \frac{f^2}{\delta \cdot F\text{-}NO}$$

wherein
H: Hyper-focal distance.
δ: Allowable circle of confusion (0.033 mm).
f: Focal length of lens.
F-No: Aperture value of lens.

When the lens is set in-focus on a hyper-focal distance, the lens becomes focused on all objects located at a greater distance than the hyper-focal distance. For the above formula, the aperture values in relation to the lenses considered to be most frequently used by beginners are shown in Table 1 below:

TABLE 1

| Focal length of lens, mm | Hyper-focal distance Aperture | | | | | |
|---|---|---|---|---|---|---|
| | F = 2 | F = 2.8 | F = 4 | F = 11 | F = 16 | F = 22 |
| 28 | 11.9 | 8.5 | 5.9 | 2.2 | 1.5 | 1.1 |
| 35 | 18.6 | 13.3 | 9.3 | 3.4 | 2.3 | 1.7 |
| 50 | 37.9 | 27.1 | 18.9 | 6.9 | 4.7 | 3.4 |
| 85 | 109 | 78.2 | 54.7 | 19.9 | 13.7 | 9.9 |
| 100 | 152 | 108 | 75.7 | 27.5 | 18.9 | 13.8 |
| 200 | 606 | 433 | 303 | 110 | 75.8 | 55.1 |

Assuming that the object to be photographed is located at a distance within 10 m, it is possible to take a picture with a sufficient pan-focus effect by using a lens with a focal length not exceeding 85 mm at the aperture value of F=22. In this specific embodiment, therefore, lenses of focal lengths not exceeding 85 mm are descriminated from those of focal lengths exceeding 85 mm. When the camera is set in the pan-focus mode with a lens of a focal length greater than 85 mm mounted thereon, the pan-focus mode is shifted to the normal program mode. In this instance, the photographer is also informed of the shift of the mode by the flickering display of the mode in the same manner as in other cases.

The relation of the focal length to the graded effect is as follows: The field depth from an in-focus plane to a far-focus plane is expressed by the following formula:

$$\alpha \approx \frac{u^2 \cdot \delta \cdot F\text{-}No}{f^2 - u \cdot \delta \cdot F\text{-}No}$$

wherein

α: Depth of field from an in-focus plane to a far-focus plane.
δ: Allowable circle of confusion (0.033 mm).
F-No: Aperture value of lens.
f: Focal length of lens.
u: Distance from center of lens to in-focus position.

The graded effect varies with an in-focus extent in the direction of distances farther from the in-focus point. For the above formula, the aperture values in relation to the lenses and the distance to the object considered to be most frequently used by beginners are shown in Table 2 below:

TABLE 2

| Focal length of lens, mm | Aperture | | | Distance to object |
|---|---|---|---|---|
| | F = 2 | F = 2.8 | F = 4 | |
| 28 | 1.01 | 1.64 | 3.06 | 3 m |
| 35 | 0.58 | 0.88 | 1.43 | 3 m |
| 50 | 0.26 | 0.37 | 0.56 | 3 m |
| 85 | 0.24 | 0.34 | 0.50 | 5 m |
| 100 | 0.17 | 0.24 | 0.35 | 5 m |
| 200 | 0.17 | 0.24 | 0.34 | 10 m |

Assuming that a sufficient degree of graded effect is obtainable within a range of the field depth up to 50 cm from an in-focus point to a far-fcous point, photography can be carried out in the graded mode with a lens of focal length exceeding 50 mm at an aperture value F=2-2.8. In this embodiment, therefore, the exposure control mode is shifted from the graded mode to the normal mode, if a lens of a focal length shorter than 50 mm is mounted on the camera in the graded mode. In that instance, the photographer is also informed of the mode shift by the flickering display of the mode. This embodiment determines whether or not a specific aperture value or a specific focal length is suited for a desired picture effect. It goes without saying that appropriate preparation of programs by combining aperture values with focal lengths minimizes possible failures in obtaining pictures with desired effects. Furthermore, addition of information on the distance to the object to be photographed (including assessed distance measurement) furthers the possibility of obtaining the desired picture effect.

Figure 7A:
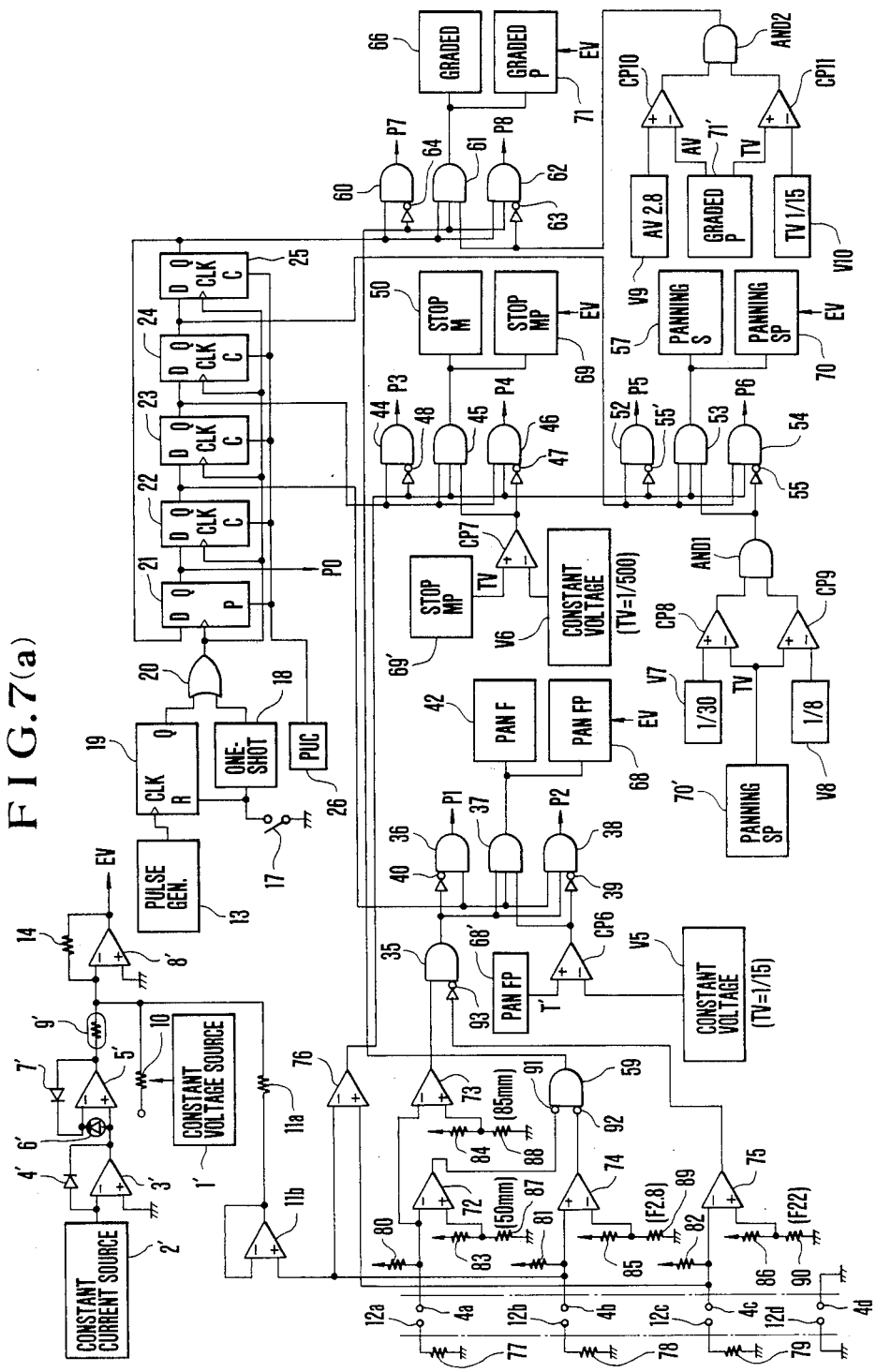
FIGS. 7(a) and 7(b) are circuit diagrams showing the control circuit arrangement of the camera of FIG. 1.
Figure 7B:
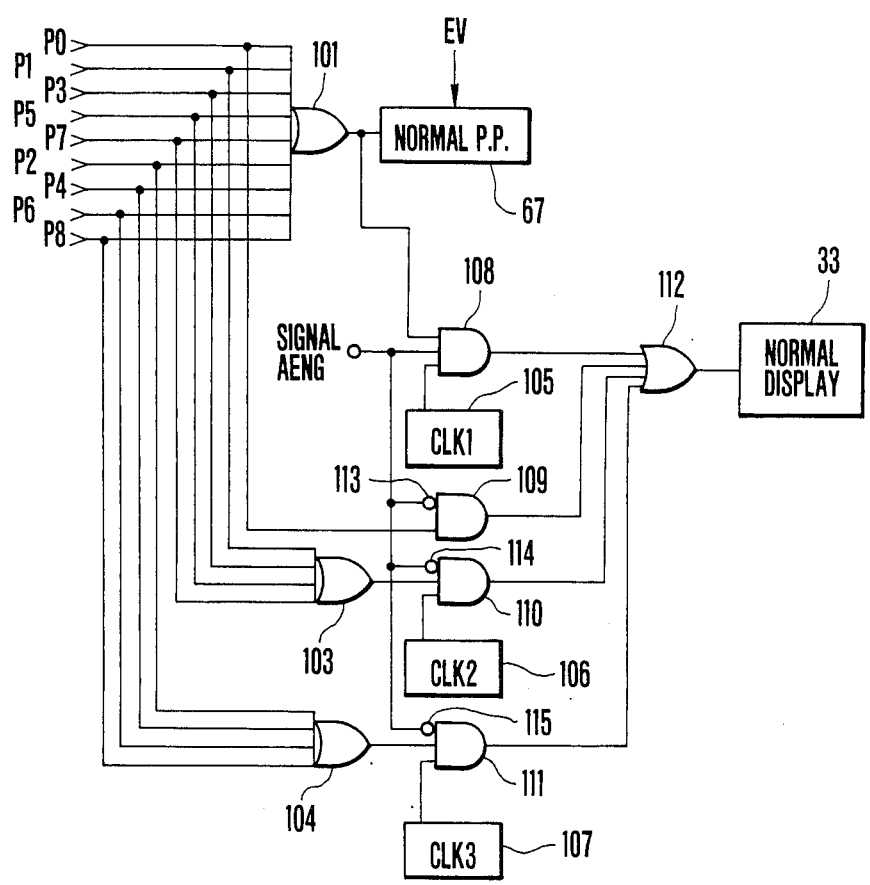

FIGS. 7(a) and 7(b) show the control circuit arrangement of the camera shown in FIG. 1. The circuit arrangement includes a constant voltage source 1'; a constant current source 2'; operational amplifiers 3', 5' and 8' (hereinafter an operational amplifier will be called OP amplifier); a temperature compensating diode 4'; a photo diode 6' which produces a photo current in proportion to the brightness of an object to be photographed; a diode 7' for logarithmic compression; a posistor 9'; a sensitivity value (Sv) information resistor 10 which gives information proportional to the sensitivity of a film; a resistor 11a; an OP amplifier 11b; and a resistor 14. These elements 1'-14 together form a known light measuring circuit. A pulse generator 13 generates reference pulses. A control mode selection switch 17 corresponds to the exposure control mode selection button 3 shown in FIG. 1. A one-shot multivibrator 18 is connected to an OR gate 20 and produces a single pulse when the switch 17 is turned on. A counter 19 has the reference pulses supplied to its terminal CLK. When a predetermined number of pulses are counted, the output of the terminal Q of the counter 19 changes from a low level (hereinafter called an L level) to a high level (hereinafter called an H level). The switch 17 is connected to the reset terminal R of the counter 19. The counter 19 stops counting when the switch 17 turns off and begins to count when the switch 17 turns on. An OR gate 20 impresses its output on the terminals CLK of D type flip-flops 21-25 Each of these flip-flops 21-25 is provided with an input terminal D and an output terminal Q. When an H level input is impressed on a preset terminal P of the flip-flop 21, the output level of the terminal Q of the flip-flop 21 becomes H. When H level inputs are impressed on clear terminals C of the flip-flops 22-25, the ouput levels of the terminals Q become L. A power-on-clear circuit 26 produces pulses which become H level for a brief period of time when power is impressed on the circuit 26 from the power source of the camera (not shown). These pulses are impressed on the terminal P of the D type flip-flop 21 and the terminals C of the D type flip-flops 22-25. The circuit arrangement further includes a comparator CP6; a constant voltage source V5 which produces a voltage corresponding to a shutter speed TV of 1/15 sec.; AND gates 35, 36, 37 and 38; inverters 39 and 40; a driving circuit 42 which drives the display elements 2a of FIG. 1 and 22'a of FIG. 2 and has the output terminal thereof connected to these display elements; 2a and 22'aa comparator CP7; a constant voltage source which produces a voltage corresponding to a shuttrr speed TV of 1/500 sec.; AND gates 44, 45 and 46; inverters 47 and 48; a driving circuit 50 which drives the display elements 2b of FIG. 1 and 22'b of FIG. 2 and has the output terminal thereof connected to these display elements 2b and 22'b; comparators CP8 and CP9; constant voltage sources V7 and V8 which produce voltages corresponding to shutter speeds TV of 1/30 and 1/8 sec. respectively; an AND gate AND 1; AND gates 52, 53 and 54; inverters 55 and 55'; a driving circuit 57 which drives the display elements 2c of FIG. 1 and 22'c of FIG. 2 and has its output terminal connected to these display elements 2c and d 22'c; comparators CP10 and CP11; a constant voltage circuit V9 which produces a voltage corresponding to an aperture value AV of F 2.8; a constant voltage source V10 which produces a voltage corresponding to a shutter speed TV of 1/15 sec.; AND gates AND 2, 59, 60, 61 and 62; inverters 63 and 64; a display driving circuit 66 which drives the display elements 2d of FIG. 1 and 22'd of FIG. 2; and program line selection circuits 67-71 which select one of the program lines A-E shown in FIG. 3 and determine a shutter speed TV and an aperture value or F-number on the line according to the output of the OP amplifier 8'. The program line selection circuit 67 selects the program line E of FIG. 3. Program line selection circuits 68'-71' are similar selection circuits but always select computation outputs. However, shutter control and aperture control are not performed on the basis of computation results. The selection circuits 68 and 68' select the program line A of FIG. 3; the selection circuits 69 and 69' select the program line B of FIG. 3; the selection circuits 70 and 70' select the program line C of FIG. 3; and the selection circuit 71 selects the program line D of FIG. 3. Comparators 72–76 produce H level outputs when voltages supplied to their non-inversion input terminals are higher than voltages supplied to their inversion terminals and produce L level outputs when the former is either lower than or equal to the latter. Reference numerals 77–90 identify resistors. Of these resistors, resistors 77–79 are disposed on the side of the lens. When the lens is mounted on the camera body 1, a terminal 12a is electrically connected to a terminal 4a, a terminal 12b to a terminal 4b, terminal 12c to a terminal 4c and a terminal 12d to a terminal 4d respectively to transmit lens information to the camera. The resistance value of the resistor 77 corresponds to the focal length of the lens and increases as the focal length increases. The resistance value of the resistor 78 corresponds to the maximum aperture F-number of the lens and increases as the latter increases. The resistance value of the resistor 79 corresponds to the minimum aperture F-number of the lens and increases as the latter increases. The resistors 80–86 are of the same resistance value. The resistance value of the resistor 87 corresponds to a focal length of 50 mm and that of the resistor 88 to a focal length of 85 mm. The resistor 89 has a resistance value which corresponds to F-number 2.8 and the resistor 90 has a resistance value which corresponds to F-number 22. Therefore, when a lens of a focal length exceeding 50 mm is mounted on the camera, the input voltage of the non-inversion input terminal of the comparator 72 becomes lower than the input voltage of the inversion input terminal and the comparator 72 produces an L level output. If the focal length of the lens mounted on the camera is less than 50 mm, the input voltage of the non-inversion input terminal of the comparator 72 becomes greater than that of the inversion input terminal and the comparator 72 produces an H level output.

Likewise, the comparator 73 produces an L level output when a lens with a focal length longer than 85 mm is mounted on the camera and produces an H level output when a lens with a focal length shorter than 85 mm is mounted on the camera. The comparator 89 produces an L level output when a lens of a maximum aperture smaller than F 2.8 is mounted on the camera and produces an H level output when a lens of with a maximum aperture larger than F 2.8 is mounted. Furthermore, the comparator 89 produces an L level output when a lens with a minimum aperture larger than F 22 is mounted on the camera.

Inverters 91, 92 and 93 respectively to invert the outputs of the comparators 72, 74 and 75.

Operation of the embodiment described above will be described below. However, the operation of the light measuring circuit (1'–14) is known and, therefore, the details will be omitted from the following description:

First, a photo current corresponding to the brightness of an object to be photographed flows at the photo diode 6'. The photo current is logarithmically compressed by the OP amplifier 5' and the logarithmic compression diode 7'. Meanwhile, the output of the temperature compensating circuit consisting of a diode 4' and the OP amplifier 3' is impressed on the non-inversion input terminal of the OP amplifier 5'. This offsets a saturation current, in a direction opposite that of the diodes 4' and 7', which have the same characteristic. Accordingly, the output of the OP amplifier 5' logarithmically compresses the brightness of the object and also becomes a voltage corresponding to the absolute temperature. This voltage is then subjected to computation by the posistor 9', the resistor 14 and the OP amplifier 8'. As a result, the output of the OP amplifier 8' becomes a logarithmically compressed value unaffected by the temperature of the brightness of the object. Furthermore, film sensitivity information obtained from the Sv information resistor 10 is added. The output of the OP amplifier 8' is further subjected to voltage correction by the maximum lens aperture correction circuit consisting of the OP amplifier 11b and the resistor 11a and, thus, becomes a voltage corresponding to an exposure value EV. The light measurement range is from EV 0 to 20.

When the power source of the camera is switched on by means of a switch (not shown), the power-on-clear circuit 26 produces one pulse shot the level of which becomes high for a brief period of time. This pulse is impressed on the terminal P of the D type flip-flop 21 and also on the terminal C of the D type flip-flops 22–25. The level of the output Q of the D type flip-flop 21 becomes H and the levels of the terminals Q of the D type flip-flops 22–25 are set at L levels respectively. This condition remains unchanged unless the switch 17 is turned on. However, once the switch 17 which corresponds to the selection button 3 of FIG. 1 is turned on, a one-shot pulse is produced from the one-shot multivibrator 18 and is supplied to the terminals CLK of the group of D type flip-flops 21–25. Then, in synchronization with the rise of the pulse, the level of tne output Q of the flip-flop 21 becomes L and that of the output Q of the flip-flop 22 becomes H, while the outputs Q of the flip-flops 23, 24 and 25 remain at L. In other words, the H level of the output Q of the D type flip-flop 21 shifts to the output Q of another flip-flop 22. Then, when the switch 17 is further turned on, the one-shot multivibrator 18 produces another one-shot pulse and the H level of the output Q of the D type flip-flop 22 shifts to the output Q of the flip-flop 23. In this manner, every time the switch 17 is turned on, the level of one of the outputs Q of the group of D type flip-flops 21–25 becomes H and the flip-flop producing the H level output Q shifts from one flip-flop to another in the order of the flip-flops 21, 22, 23, 24 and 25 and then again shifts from flip-flop 25 to flip-flop 21 repeating the same sequence. Furthermore, since the reset terminal R of the counter 19 is connected to the switch 17, the counter 19 is in a reset condition, and its output Q remains at an L level while the switch 17 is off. If the switch 17 is momentarily turned on and turned off in a very short period of time, although the counter 19 begins to count on the basis of the reference pulse in that instance, the counter 19 resumes the reset condition before the level of the output Q becomes H. In that instance, therefore, the level of the output Q of the counter never becomes high (H) in the same manner as when the switche 17 is left off. However, if the switch 17 is kept on over a predetermined period of time or over a longer period, the counter 19 performs a counting action and the level of the output Q thereof alternately becomes H and L in a predetermined cycle. The output Q of the counter 19 is impressed via the OR gate 20 on the terminals CLK of the group of D type flip-flops 21–25. At the time when the power source is switched on, therefore, the H level of the output Q of the D type flip-flop 21 shifts to other D type flip-flops, one after another, at predetermined time intervals in the order of the D type flip-flops 22→24→≅→21→, as mentioned above. Then, when the switch 17 is turned off, the counter 19 is reset. With the counter 19 thus reset, the output Q of one of the flip-flops 21-25, which is at an H level when the switch 19 is turned off, remains at that H level.

As mentioned above, only the output Q of the flip-flop 21 among the outputs Q of the D type flip-flops 21-25 is at an H level when the power source is switched on. At that point of time, the output P0 produced from the output terminal Q is supplied to a program line selection circuit 67 via an OR gate 101, as shown in FIG. 7(b). Therefore, a shutter speed T and an aperture value F-No. are determined on the program line E of FIG. 3 according to an exposure value Ev selected by the program line selection circuit 67, i.e. the output of the OP amplifier 8'. At that time, if a signal AENG produced from a circuit block G, which will be described later herein, is at an L level, the level of the output of an inverter 113 becomes H. Accordingly, the level of AND gate 108 becomes an L and that of the output of an AND gate 109 becomes H. This actuates a driving circuit 33 via an OR gate 112. As a result, the displays 2e of FIG. 1 and 22'e of FIG. 2 light up indicating the program mode (normal program mode) which is selected in this instance. Since all the signals P1-P8 are at L levels, the outputs of OR gates 103 and 104 are at L levels. Therefore, the outputs of both AND gates 110 and 111 are at L levels. However, if the signal AENG produced from the circuit block-which will be described later is at an H level, this signal AENG comes via inverters 113, 114 and 115 to the AND gates 109, 110 and 111. This causes the outputs of the AND gates 109, 110 and 111 to be at L levels. The output of a counter 105, which is repeatedly and alternately producing its output at an H level and an L level at predetermined intervals, is supplied to one of the input terminals of the AND gate 108. This causes the displays 2e of FIG. 1 and 22'e of FIG. 2 to flicker. This flickering display thus gives a warning to the camera operator that, although the program line E of FIG. 3 is selected, it is impossible to obtain good photographs from the selected program line.

Next, when the switch 17, which corresponds to the selector button 3 of FIG. 1, is again turned on for a brief period of time, the level of the output Q of the flip-flop 22 alone becomes H among the group of D type flip-flops 21-25. The H level output Q of the flip-flop 22 then reaches one of the input terminals of each of the AND gates 36, 37 and 38. This actuates and causes the program line selection circuit 68 to select the program line A of FIG. 3.

Let us assume that, in this instance, a lens with a focal length longer than 85 mm or with a minimum aperture smaller than F 22 is mounted on the camera. If a lens has a focal length longer than 85 mm, the comparator 73 produces an L level output. The L level output is supplied to one input terminal of the AND gate 35. If the lens mounted has a minimum aperture smaller than F 22, the comparator 73 produces an H level output. This H level output is inverted via the inverter 93 to an L level and is then supplied to the other input terminal of the AND gate 35. Therefore, with a lens of a focal length longer than 85 mm or a lens of a minimum aperture smaller than F 22 mounted on the camera, the AND gate 35 produces an L level output. The L level output of the AND gate 35 is supplied to the AND gates 37 and 38 making the levels of these AND gates 37 and 38 L. Furthermore, the output of the AND gate 35 is inverted by the inverter 40 and is then supplied to the AND gate 36. This makes the level of the output P1 of the AND gate 36 H. The H level output P1 is supplied via the OR gate 101 of FIG. 7(b) to the program line selection circuit 67. Then, the program line selection circuit 67 selects the program line E (for the normal program mode). If the signal AENG is at an L level in this instance, the output level of the inverter 114 becomes H. Then, the H level output P1 is impressed via the OR gate 103 on the AND gate 110. Meanwhile, an on-off signal is supplied in a predetermined cycle from a counter CLK2 to another input terminal of the AND gate 110. Accordingly, the wave form of the output of the AND gate 110 is identical with that of the output of the counter CLK2. Since the signal thus produced from the AND gate 110 is impressed via the OR gate 112 on the driving circuit 33, the displays 2e of FIG. 1 and 22'e of FIG. 2 flicker. This flickering display informs the photographer that, although the pan-focus mode is selected as desired by the photographer, the selected mode is shifted to the normal program mode because the lens in use is unsuited for pan-focus mode photography. In the event that the signal AENG is produced at an H level, it is only the AND gate 108 that receives an H level input. Therefore, in that situation, the driving circuit 33 makes the flickering display at the frequency of another counter CLK1.

When a lens mounted on the camera is of a focal length shorter than 85 mm and of a minimum aperture larger than F 22, the AND gate 35 produces an H level output. Then, if the voltage (hereinafter called VTV), which corresponds to the shutter speed value TV and is produced from the program line selection circuit, is higher than a voltage corresponding to a shutter speed value TV of 1/15 sec. at that time, the comparator CP6 produces an H level output. The output level of the AND gate 37 then becomes H. This renders the program line selection circuit 68 operative selecting the program line A of FIG. 3. The driving circuit 42 also operates lighting up the displays 2a of FIG. 1 and 22'a of FIG. 2, so that the camera operator is informed of the selection of the program line A of FIG. 3. In the event that the voltage VTV is lower than the voltage corresponding to the shutter speed TV of 1/15 sec., the output level of the comparator CP6 becomes L. The output level of the inverter 39 becomes H. The level of the signal P2 thus produced from the AND gate 38 becomes H. The output signal P2 of the AND gate 38 (see FIG. 7(b)) then actuates the program line selection circuit 67 via the OR gate 101 selecting the program line E (normal) of FIG. 3. The signal P2 is also impressed on the AND gate 111 via the OR gate 104. However, an on-off signal from a counter CLK3 is impressed in a predetermined cycle on the other input terminal of the AND gate 111. The wave form of the output of the AND gate 111 becomes the same as that of the output of the counter CLK3. The signal thus produced from the AND gate 111 is impressed via the OR gate 112 on the driving circuit 33. This causes the displays 2e of FIG. 1 and 22'e of FIG. 2 to flicker. Furthermore, if the signal AENG is at an H level, the AND gate 108 receives an H level input. Therefore, this causes the display to flicker at the frequency of the counter CLK1.

As is apparent from the foregoing description, with the pan-focus mode selected by the photographer, the selected mode is automatically shifted to the normal program mode if the pan-focus effect cannot be obtained. In this instance, if the reason for the shift lies in the lens, the displays 2e of FIG. 1 and 22'e of FIG. 2 flicker at the frequency of the counter CLK2; and, if it resides in the quantity of light, the display flickers at the frequency of the counter CLK3. Furthermore, if the reason lies with both the lens and the quantity of light, the display flickers at the frequency of another counter CLK2. In the event that the signal AENG is at an H level even after shifting to the normal program mode, the exposure cannot be correctly effected. In that instance, the display flickers at the frequency of the counter CLK1. With the counters CLK1, CLK2 and CLK3 arranged in this manner performing their output level inverting operations in different cycles, the photographer is informed whether the reason for the impossibility of selection of the desired mode resides in the lens in use or in inapposite light quantity. This arrangement enables the photographer to know whether an apposite exposure is possible or not.

After the above operation, when the switch 17 is again turned on for a brief period of time, the level of the output Q of the flip-flop 23 at this time becomes H. This means that the photographer wishes to photograph in the stop motion mode. In this instance, if the maximum aperture and the minimum aperture of the lens is of the same value, i.e. in the case of a fixed aperture, the comparator 76 produces an L level output. The level of the output P3 of the AND gate 44 becomes H. The normal program line is selected via the OR gate 101. The displays 2e of FIG. 1 and 22'e of FIG. 2 then flicker at the frequency of the counter CLK 2. If the lens is not of a fixed aperture, the comparator CP7 produces an H level output. In that instance, if a voltage, which is produced from the stop motion program computing circuit 69' and which corresponds to a computed shutter speed value TV, is higher than a voltage corresponding to a shutter speed TV of 1/500 sec., the comparator CP7 produces an H level output and the output level of the AND gate 45 becomes H. Therefore, the stop motion program line selection circuit 69 is selected. The circuit 69 in turn selects the program line B of FIG. 3. The driving circuit 50 operates, lighting up the displays 2b of FIG. 1 and 22'b of FIG. 2. This informs the photographer of the selection of the stop motion program line B of FIG. 3. When the shutter speed becomes lower than 1/500 sec., the comparator CP7 produces an L level output. The L level output is inverted by the inverter 47 and is then supplied to the AND gate 46. The level of the output P4 of the AND gate 46 becomes H. The output P4 selects the normal program line selection circuit 67 and the program line E of FIG. 3 is selected. Since, in this case, the output or signal P4 is supplied via the OR gate 104 to the AND gate 111, the displays 2e of FIG. 1 and 22'e of FIG. 2 flicker at the frequency of the counter CLK3. Furthermore, if the signal AENG is at an H level, it is only the AND gate 108 that receives an H level input. Then, the display flickers at the frequency of the counter CLK1.

The rest of the operation of the embodiment is similar to the foregoing description and thus requires no detailed description. When the switch 17 is turned on for a brief time period for the panning shot mode, the normal program line E of FIG. 3 is selected, if the lens in use is of a fixed aperture. Then, the displays 2e of FIG. 1 and 22'e of FIG. 2 flicker at the frequency of the counter CLK2. If the lens is not of a fixed aperture and if the shutter speed is within a range of from 1/8 to 1/30 sec., the panning program line C of FIG. 3 is selected. The displays 2c of FIG. 1 and 22'c of FIG. 2 then light up. If the shutter speed is not within the range of 1/8–1/30 sec., the normal program line E of FIG. 3 is again selected. The displays 2e of FIG. 1 and 22'e of FIG. 2 then flicker at the frequency of the counter CLK3. Furthermore, when the normal program mode is unexpectedly obtained instead of a desired mode, if the signal AENG from the circuit block G is at an H level, the displays 2e of FIG. 1 and 22'e of FIG. 2 flicker at the frequency of the counter CLK1 to give warning that an apposite exposure cannot be obtained. Then, when the switch 17 is once again turned on for a brief period of time in expectation of the graded mode, if the lens in use is of a maximum or full-open F-number greater than F 2.8 or of a focal length shorter than 50 mm, the normal program line E of FIG. 3 is selected and the displays 2e of FIG. 1 and 22'e of FIG. 2 flicker at the frequency of the counter CLK2. If the lens is of a maximum or full-open F-number smaller than F 2.8 and of a focal length longer than 50 mm and if a computed shutter speed is higher than 1/15 and a computed F-number is greater than F 2.8, the graded mode program line D of FIG. 3 is selected and the displays 2d of FIG. 1 and 22'd of FIG. 2 light up. If the range deviates, the normal program line E of FIG. 3 is selected and the display flickers at the frequency of the counter CLK3. When the normal program mode is unexpectedly obtained, if the level of the signal AENG produced from the circuit block G becomes H, the displays 2e of FIG. 1 and 22'e of FIG. 2 flicker at the frequency of the counter CLK1, warning that an apposite exposure cannot be obtained.

Figure 8:
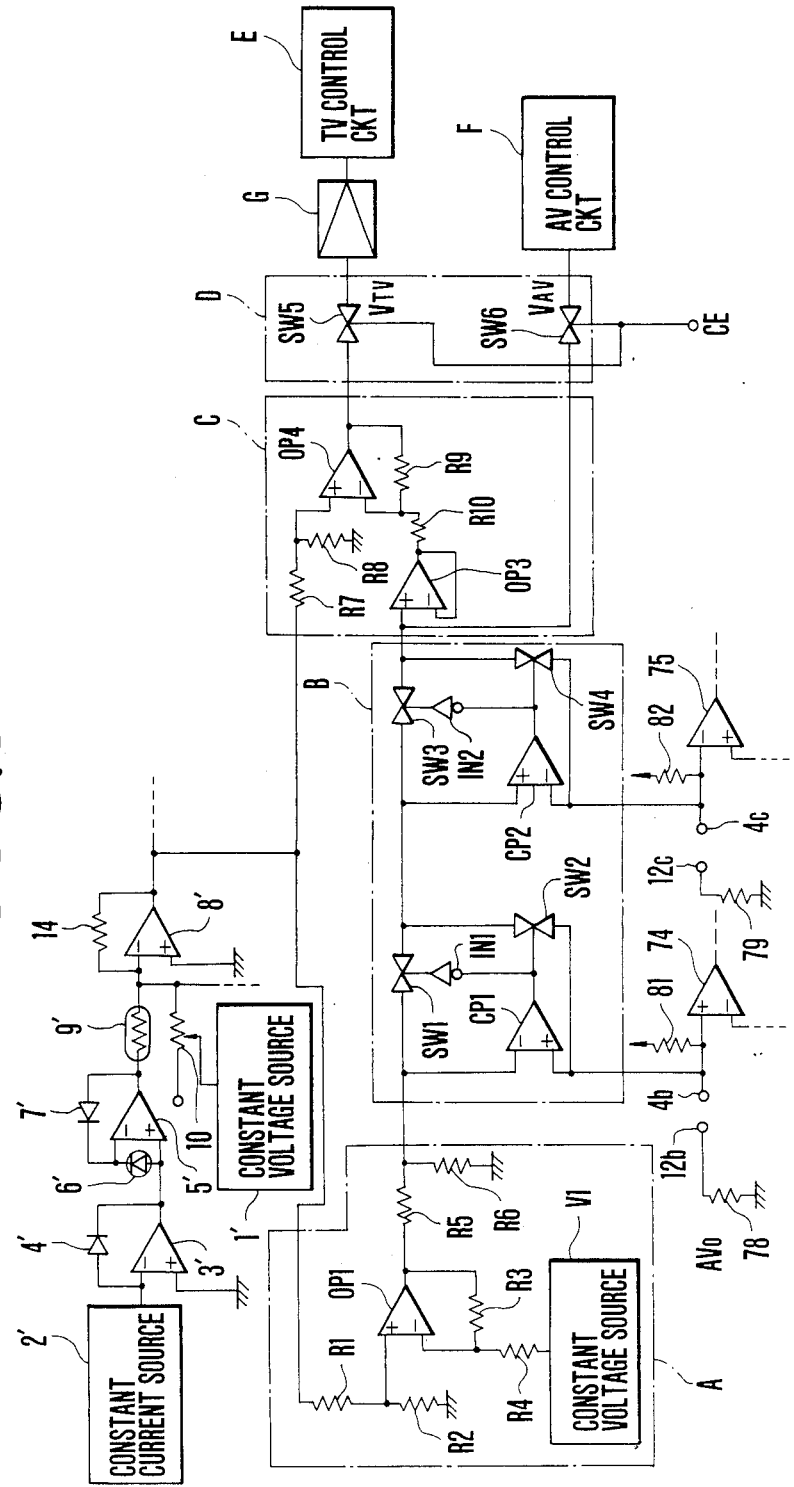
FIG. 8 is a circuit diagram showing a program line selection circuit connected to the circuit of FIG. 7(a).

The program line selection circuit connected to the circuit arrangement of FIG. 7(a) is arranged as shown in FIG. 8. Of the blocks encompassed with one-dot-chain lines, a block A represents an aperture value (AV) computing circuit; a block B represents a computed AV correction circuit; a block C represents a shutter time (TV) computing circuit; and a block D represents a program line selection shifting circuit. Each of these circuit blocks is arranged as follows: The circuit arrangement includes a TV control circuit E; an AV control circuit F; and an apposite exposure determining circuit G. A program line selection circuit is formed by the four blocks A–D. Furthermore, the connected circuits, other than the circuits A–F, are shown in FIG. 7(a) and are thus identified by the same reference numerals as those used in FIG. 7(a).

In the block A, there are provided resistors R1, R2, R3 and R4; an operational amplifier OP1 (hereinafter called OP amplifier); a constant voltage source V1; and resistors R5 and R6. The operation of the block A is as follows: A known computing circuit is formed by the OP amplifier OP1 and the resistors R1, R2, R3 and R4. A voltage (hereinafter called voltage VEV), which corresponds to an exposure value EV and is produced from an OP amplifier 8', is voltage divided by the resistors R1 and R2 in such a manner as R2·EV/(R1+R2) and is then supplied to the non-inversion input terminal of the OP amplifier OP1. Meanwhile, a voltage (hereinafter called VREF), which is produced from a constant voltage source V1, is supplied via the resistor R4 to the inversion input terminal of the OP amplifier OP1. Therefore, the output voltage of the OP amplifier OP1 becomes as shown below:

$$(R2/(R1+R2))VEV - (R3/(R3+R4))VREF$$

Assuming that the resistors R1, R2, R3 and R4 are of the same resistance value, the output voltage of the OP amplifier OP1 becomes: VEV−VREF. The output voltage VEV—VREF of the OP amplifier OP1 is voltage divided by the resistors R5 and R6 to become:

$$(VEV - VREF) \cdot \frac{R6}{R5 + R6}$$

Assuming that this voltage value is VAV, the voltage VAV is a function of the values VEV and VREF, R5 and R6. With the values VREF, R5 and R6 set at suitable values, the value EV can be produced in different values. These values are combined differently for the normal program, the pan-focus program, the stop motion (M) program and the panning shot program computing and obtaining the value VAV corresponding to each of the different modes. The value VAV is a voltage value corresponding to the aperture value AV. Table 3 shows, by way of example, relations between the values VEV and EV and between the values VAV and AV.

TABLE 3

| EV value | VEV | AV value (F-number) | VAV |
|---|---|---|---|
| 5 | 0.5 (V) | 0 (1) | 0 (V) |
| 6 | 0.6 | 1 (1.4) | 0.1 |
| 7 | 0.7 | 2 (2) | 0.2 |
| 8 | 0.8 | 3 (2.8) | 0.3 |
| 9 | 0.9 | 4 (4) | 0.4 |
| 10 | 1.0 | 5 (5.6) | 0.5 |
| 11 | 1.1 | 6 (8) | 0.6 |
| 12 | 1.2 | 7 (11) | 0.7 |
| 13 | 1.3 | 8 (16) | 0.8 |
| 14 | 1.4 | 9 (22) | 0.9 |
| 15 | 1.5 | 10 (32) | 1.0 |
| 16 | 1.6 | | 1.1 |
| 17 | 1.7 | | 1.2 |
| 18 | 1.8 | | 1.3 |
| 19 | 1.9 | | 1.4 |

In the relation shown above, the value VAV is computed and produced for each of the different modes on the basis shown below:

In the normal program mode: VREF=0.1 V, R6=R5.
In the pan-focus mode: VREF= −0.1 V, R5=0 or R6=∞.
In the panning shot mode: VREF=0.4 V, R5=0 or R6=∞.
In the stop motion and graded modes: VREF=1.0 V, R5=0 or R6=∞.

The voltage VAV computed by the block A is supplied to the next block B.

Next, the operation of the block B is as follows: The block B includes analog switches SW1, SW2, SW3 and SW4 which become conductive when a high level signal is impressed on each of them; inverters IN1 and IN2; and comparators CP1 and CP2. The analog switches SW1 and SW2, the comparator CP1 and the inverter IN1 form the primary stage of the block B. A voltage (hereinafter called the voltage AVO) divided by the resistor 81 and the resistor 78 which is of a resistance value corresponding to the aperture value AV of a maximum or full-open F-number and which is disposed within the lens, is impressed on the non-inversion input terminal of the comparator CP1. Meanwhile, the voltage VAV, which corresponds to the computed aperture value AV produced from the block A, is impressed on the inversion input terminal of the comparator CP1. The comparator CP1 produces an L level output when the voltage VAV is higher than the voltage VAVO.

This L level output is inverted into an H level by the inverter IN1 and renders the analog switch SW1 conductive. Furthermore, the L level output of the comparator CP1 is also impressed on the control terminal of another analog switch SW2 and it renders the analog switch SW2 non-conductive. With the analog switch SW1 conductive and the analog switch SW2 non-conductive, the voltage VAV recieved from the block A is supplied to the next stage of the block B.

In the event that the voltage VAV is lower than the voltage VAVO, the comparator CP1 produces an H level output rendering the analog switch SW2 conductive. The H level output is also inverted into an L level by the inverter IN1 and renders the analog switch SW1 non-conductive. As a result, the voltage VAVO is supplied to the next stage.

As apparent from the above description, the primary stage of the block B serves as a limiter to prevent the voltage VAV, which comes from the block A, from becoming lower than the voltage VAVO. The next stage of the block B is formed by the analog switches SW3 and SW4, the comparator CP2 and the inverter IN2. The operation of the next stage is similar to that of the primary stage and thus does not require a detailed description. The voltage produced from the primary stage is impressed on the non-inversion input terminal of the comparator CP2. A voltage (hereinafter called the voltage VAVMAX) divided by a resistor 82 and a resistor 79, which is of a resistance value corresponding to the minimum aperture value of the lens and which is disposed within the lens as shown in FIG. 7, is impressed on the inversion input terminal of the comparator CP2.

In the next stage, when the voltage produced from the primary stage exceeds the voltage VAVMAX, the analog switch SW3 becomes non-conductive and the analog switch SW4 becomes conductive producing the voltage VAVMAX. The next stage of the block B serves as a limiter, preventing the output of the whole block B from exceeding the voltage VAVMAX. Hereinafter the output voltage of the block B will be called the voltage VAV'. The output voltage VAV' of the block B thus becomes a value obtained by restricting the voltage produced from the computing circuit A in a range between the minimum aperture value and the maximum aperture value of the lens. The circuit block C is a TV (shutter speed) computing circuit.

The block C includes OP amplifiers OP3 and OP4; and resistors R7, R8, R9 and R10. The OP amplifier OP4 and the resistors R7, R8, R9 and R10 together form a known subtraction circuit. The voltage VAV' produced from the block B comes through a buffer circuit formed by the OP amplifier OP3 and is then supplied via the resistor R10 to the inversion input terminal of the OP amplifier OP4. Meanwhile, the voltage VEV is supplied via the resistor R7 to the non-inversion input terminal of the OP amplifier OP4. The output voltage of the OP amplifier OP4, therefore, becomes:

(R8/(R7+R8))VEV−(R9/(R9+R10))VAV'

Assuming that the resistors R7, R8, R9 and R10 are of the same resistance value, the output voltage of the OP amplifier OP4 becomes: VEV−VAV'. The output voltage VEV−VAV'=VTV is supplied via the analog switch SW5 to a TV control circuit E. The TV control circuit E controls a shutter speed corresponding to the voltage VTV. Meanwhile, the voltage VAV' produced from the block B is supplied via an analog switch SW6 of the block D to an AV control circuit F. The AV control circuit F performs aperture control in a manner corresponding to the aperture value VAV. The results of computation VTV and VAV' are produced at the display circuit mentioned in the foregoing.

The block D is provided with an input terminal CE, which is a switching input terminal for each of the selection circuits 67–71 is shown in FIG. 7(I a). The input terminal CE of each of these circuits becomes conductive when an H level input is impressed thereon and thus permits information transmittal to the TV control circuit E and the AV control circuit F.

Each of the program line selection circuits 67–71 consists of the blocks A–D arranged as shown in FIG. 8.

Figure 9:
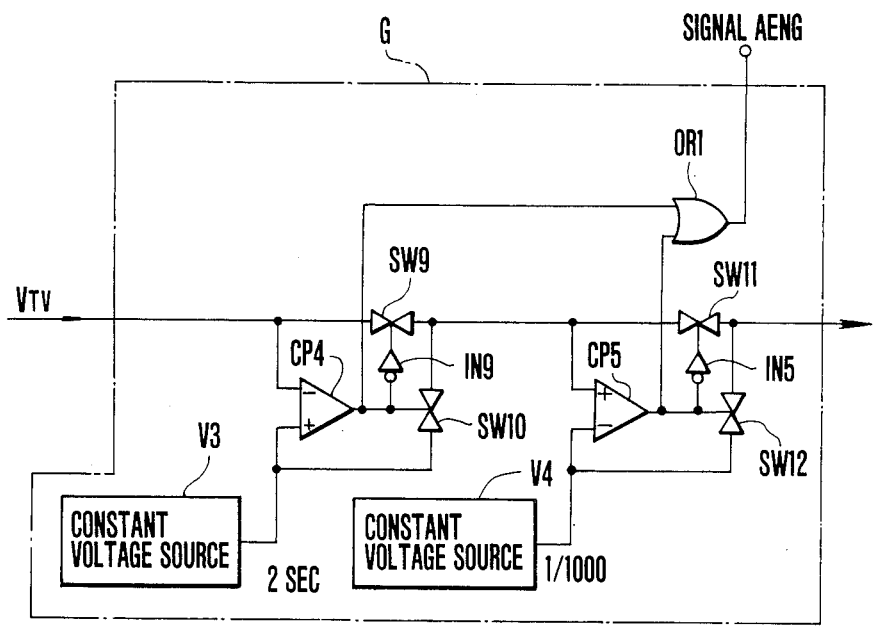
FIG. 9 is a circuit diagram showing the details of an apposite exposure determining circuit shown in FIG. 8.

FIG. 9 shows the details of the apposite exposure determining circuit G of FIG. 8. The circuit block G includes analog switches SW9, SW10, SW11 and SW12; inverters IN4 and IN5; comparators CP4 and CP5; a constant voltage source V3 which produces, when the shutter speed is 2 sec., a voltage corresponding to the shutter speed value TV (hereinafter called the voltage V2SEC); and another constant voltage source V4 which produces, when the shutter speed is 1/1000 sec., a voltage corresponding to the shutter speed value TV (hereinafter called the voltage V1/1000SEC). The operation of this circuit block is similar to the circuit block B of FIG. 8. When the voltage VTV, which is supplied from the preceding circuit block D, is smaller than the voltage V2SEC, the comparator CP4 produces an H level output rendering the analog switch SW10 conductive. This prevents the voltage VTV from becoming smaller than the voltage V2SEC. At the same time, an H level output is produced via an OR gate OR1 to an AENG signal terminal informing the subsequent circuit that it is impossible to obtain an apposite exposure. In the event that the voltage VTV exceeds the voltage V1/1000SEC, the comparator CP5 produces an H level output. This renders the analog switch 12 conductive restricting and preventing the voltage VTV from surpassing the voltage V1/1000SEC. Furthermore, the H level output is also supplied via the OR gate OR1 to the AENG signal terminal to likewise inform the subsequent circuit that an apposite exposure is not obtainable.

In the embodiment of the invention, described in the foregoing, combinations of aperture values and shutter speed values required for obtaining picture image effects of varied kinds are programmed beforehand within the camera in a manner which enables even the beginning photographer to obtain picture image effects derivable from the combinations of aperture values and shutter speed or time values. Simple pictographs and symbols depicting these programmed exposure control modes are displayed within or without the view finder. The embodiment determines whether a programmed exposure control mode, which is selected, is feasible or not with the maximum F-number, the minimum aperture, the fixed aperture or the focal length of the lens in use. If it is not feasible, the selected program is changed to another program. Therefore, even when a desired picture effect is not obtainable from the lens in use, at least a normal or standard picture can be taken without difficulty.

Figure 10:
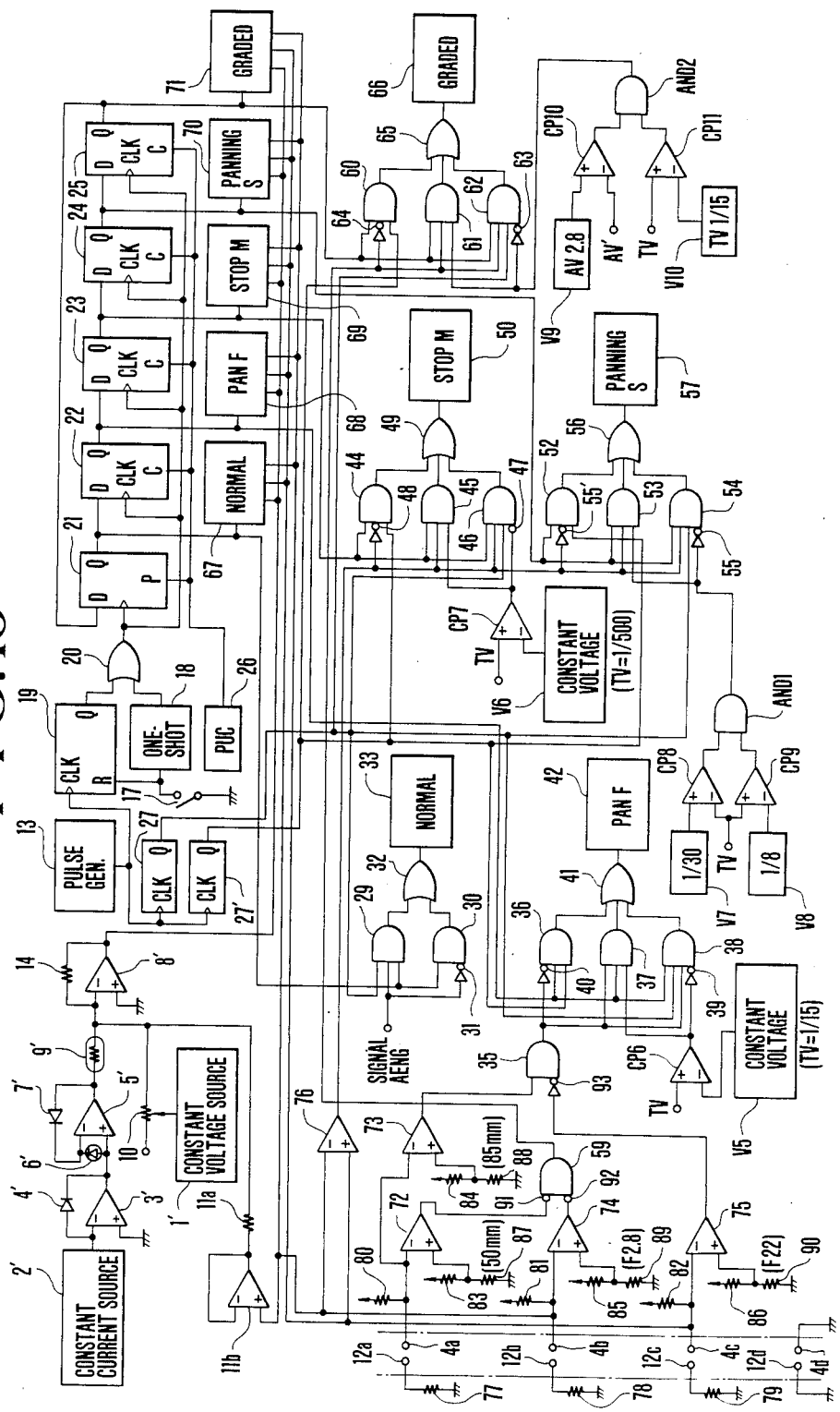
FIG. 10 is a circuit diagram showing another example of the control circuit of the camera of FIG. 1.

FIG. 10 shows another example of the control circuit arrangement for the camera shown in FIG. 1. The parts of FIG. 10 that are identical with corresponding parts of FIGS. 7(a) and 7(b) are indicated by the same reference numerals and symbols and their details are omitted from the following description. The circuit arrangement includes the counter 27. The reference pulses produced from the pulse generator 13 are impressed on the terminal CLK of the counter 27 in the same manner as the counter 19. When a predetermined number of pulses have been counted, the level of the terminal Q of the counter changes from L to H. A counter 27' similarly has the reference pulses from the pulse generator 13 impressed on the terminal CLK and changes the output level of the terminal Q thereof from L to H upon completion of counting a predetermined number of pulses. The counters 27 and 27' differ from each other in the number of pulses to be counted. Accordingly, they perform the output level inverting operation in different cycles from each other. The output of the output terminal Q of the counter 17 is supplied to the AND gates 29, 38, 46, 54 and 62. The Q terminal output of the counter 17' is supplied to the AND gates 36, 44, 52 and 60. The circuit arrangement further includes an inverter 31, an OR gate 32 and a driving circuit 33 which has its output terminal connected to the displays 2e of FIG. 1 and 22'e of FIG. 2 and thus drives the displays 2e and 22'e. The outputs of the AND gates 36, 37 and 38 are supplied to an OR gate 41. A driving circuit 42 has its output terminal connected to the above displays 2a of FIG. 1 and 22'a of FIG. 2 and drives the displays. The outputs of AND gates 44, 45 and 46 are supplied to an OR gate 49. A driving cicuit 50 has its output terminal connected to the above displays 2b of FIG. 1 and 22'b of FIG. 2 and drives the displays 2b and 22'b. The outputs of AND gates 52, 53 and 54 are supplied to an OR gate 56. A driving circuit 57 has its output terminal connected to the displays 2c of FIG. 1 and 22'c of FIG. 2 and drives the displays 2c and 22'c. The outputs of AND gates 60, 61 and 62 are supplied to an OR gate 65. A driving crcuit 66 has its output terminal connected to the displays 2d of FIG. 1 and 22'd of FIG. 2 and drives the displays 2d and 22'd. Each of the program line selection circuits 67–71 selects one of the program 1 lines A–E of FIG. 3 and determines the shutter speed TV and the aperture value F-number (F-NO.) depending on the output of the OP amplifier 8' disposed on the line. The program line selection circuit 67 selects the program line E of FIG. 3. The circuit 68 selects the line A of FIG. 3. The circuit 69 selects the line B of FIG. 3. The circuit 70 selects the line C of FIG. 3. The circuit 71 selects the line D of FIG. 4. Each of these program lines has voltages corresponding to the maximum aperture value and the minimum aperture value of the lens impressed thereon and has magic applied thereto. Furthermore, each of the program line selection circuits 67–71 is selected with the output of one of the flip-flop circuits 21–25 applied thereto.

Figure 11:
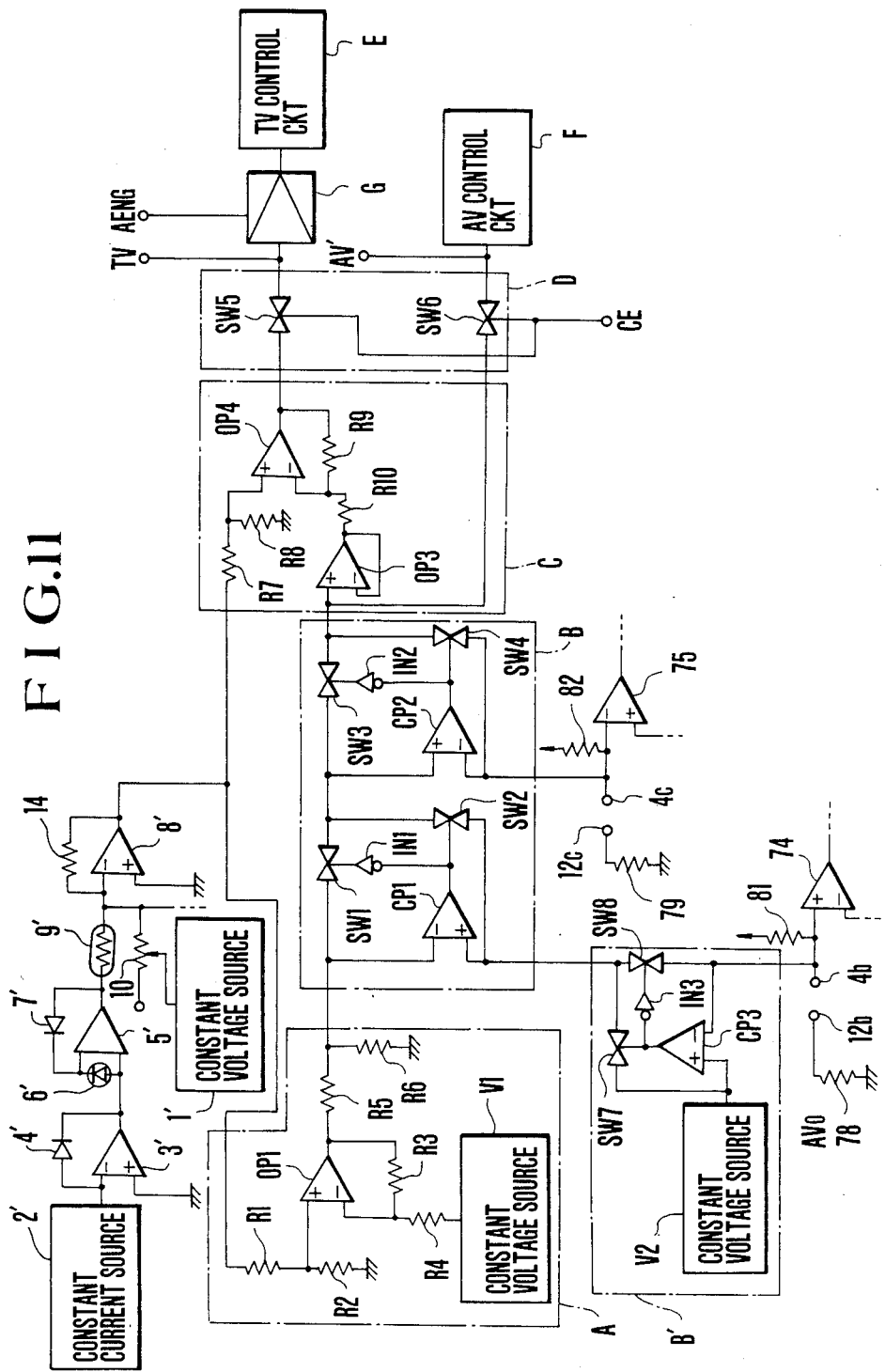
FIG. 11 is a circuit diagram showing the program line selection circuit shown in FIG. 10.

FIG. 11 shows the details of each of the program line selection circuits included in the circuit arrangement of FIG. 10. The parts of FIG. 11 identical with the corresponding parts of FIG. 8 are indicated by the same reference numerals and symbols as those used in FIG. 8 and their details are omitted from the following description. In a computed AV value correction circuit B', the analog switches SW7 and SW8 are respectively conductive when high level signals are impressed on them. The circuit B' includes the inverter IN3 and a comparator CP3. A voltage corresponding to an aperture value AV when the F-number is F 2 (AV=2) is produced from a constant voltage source V2 and is impressed on the non-inversion input terminal of the comparator CP3. Meanwhile, a voltage divided by a resistor 81 and a resistor 78, which has a resistance value corresponding to the maximum aperture value AV or a maximum F-number and is disposed within the lens, is impressed on the inversion input terminal of the comparator CP3. When the maximum F-number of the lens is smaller than 2, the comparator CP3 produces an H level output. Then, the analog switch SW7 becomes conductive allowing a voltage corresponding to F 2 to be supplied to the circuit block B. Conversely, when the maximum F-number of the lens is larger than 2, the comparator CP3 produces an L level output. The output is inverted by the inverter IN3 and then renders the analog switch SW8 conductive. Therefore, when the maximum F-number of the lens is above 2, the voltage corresponding to the aperture value AV of the maximum F-number is allowed to enter, as is, the block B.

As apparent from the above description, the circuit block B' serves as a limiter when the maximum F-number of the lens is below F2.

The output voltage of the OP amplifier OP4 becomes VEV−VAV' in the same manner as in FIG. 8. The output voltage VEV−VAV'=VTV is supplied via the switch SW5 to an apposite exposure determining circuit block G and then to a TV control circuit E. The TV control circuit E then controls a shutter speed corresponding to the voltage VTV. Meanwhile, an output voltage AV' produced from a block B is supplied via an analog switch SW6 of a block D to an AV control circuit F. The AV control circuit then controls an aperture corresponding to the voltage VAV'.

The input terminal CE of the block D, which produces the results of computation VTV and VAV', is a switching input terminal of each of the selection circuits 67–71 shown in FIG. 7, as mentioned in the foregoing. The input terminal CE becomes conductive when an H level input is impressed thereon permitting information to be transferred to the TV control circuit E and the AV control circuit F.

Each of the program line selection circuits 67–71 consists of the blocks A–D and B', as shown in FIG. 11.

The details of the apposite exposure determining circuit included in FIG. 11 are as shown in FIG. 9 and have already been described in the foregoing.

Operation of the above-described arrangement of the embodiment is as follows: As has been described with reference to FIG. 7, a voltage corresponding to exposure light quantity EV can be obtained from the OP amplifier 8'. When the power source of the camera is turned on by a switch (not shown), the power-on-clear circuit 26 produces a single pulse shot for a brief period of time. This pulse is impressed on the terminal P of the D type flip-flop 21 and also on the terminal C of the D type flip-flops 22–25. The level of the output Q of the D type flip-flop 21 is set at H while the levels of the outputs Q of the D type flip-flops 22–25 are set at L levels. This condition is retained until the switch 17 is again turned on. The level of one of the outputs Q of the group of D type flip-flops 21–25 becomes an H level and the flip-flop having the H level output Q shifts, one to another, among the group of flip-flops 21–25 every time the switch 17 is turned on. The shift takes place from the flip-flop 21 toward the flip-flop 25 and then from the flip-flop 25 back to the flip-flop 21 in a repeating manner. Furthermore, when the switch 17 is on longer than a predetermined period of time, the counter 19 performs a counting action. Then, the level of the output Q of the counter 19 alternately becomes an H level and an L level in a recurring manner at predetermined intervals. The output Q of the counter 19 is impressed via an OR gate 20 on the terminals CLK of the group of D type flip-flops 21-25. Therefore, the high level state of the output Q, which takes place at the D type flip-flop 21 at a time when the power source is switched on, shifts to other flip-flops 21-25 one after another at predetermined intervals in the same manner as described in the foregoing and in the sequence of the D type flip-flops 22→23→24→25→21→. When the switch 17 is turned off after continuous operation thereon, the counter 19 is reset. Then, one of the D type flip-flops 21-25 that is in the H level state when the switch 17 is turned off keeps its output Q in the H level.

As mentioned above, only the output Q of the flip-flop 21 among the outputs Q of the D type flip-flops 21-25 is at an H level when the power source is switched on. Therefore, at that point of time, the program line selection circuit 67, to which the output terminal Q of the flip-flop 21 is connected, is selected. Then, in accordance with the exposure light quantity EV, i.e. the output of the OP amplifier 8', the shutter speed T and the aperture value F-NO. are determined on the program line E of FIG. 3. In that instance, if the signal produced from the circuit block G is at an L level, the output level of the inverter 31 becomes an H level. Accordingly, the output level of the AND gate 29 becomes an L level and that of the AND gate 30 an H level. The H level output of the AND gate 30 renders the driving circuit 33 operative via the OR gate 32. The displays 2e of FIG. 1 and 22'e of FIG. 2 light up displaying the selected program mode. However, if the signal AENG from the circuit block G is at an H level, the output level of the AND gate 30 becomes an L level through the inverter 31. Meanwhile, since the reference pulses from the pulse generator 13 are impressed on the terminal CLK of the counter 27, the output Q of the counter 27 is changing its level between an H level and an L level at predetermined intervals. This output Q of the counter 27 is impressed on one of the input terminals of the AND gate 29. Therefore, the output wave form of the AND gate 29 becomes the same as that of the output Q of the counter 27. Furthermore, the signal thus produced from the AND gate 29 is further impressed on the driving circuit 33 via the OR gate 32. As a result, the displays 2e of FIG. 1 and 22'e of FIG. 2 flicker. The flickering display gives warning to the photographer that, although the program line E of FIG. 3 is selected, no apposite photograph is obtainable.

Then, when the switch 17, which corresponds to the button 3 of FIG. 1, is again turned on for a brief period of time, the level of the output Q of the D type flip-flop 22 alone becomes H among the group of flip-flops 21-25. This actuates the program line selection circuit 68 and the program line A of FIG. 3 is selected. Let us assume that the lens mounted on the camera in this instance is of a focal length greater than 85 mm or of a minimum aperture F-NO. smaller than 22. With the lens having a focal length greater than 85 mm mounted, the comparator 73 produces an L level output, which is supplied to one of the input terminals of the AND gate 35. Furthermore, with the lens of the minimum aperture F-NO. smaller than 22 mounted, the comparator 75 produces an H level output. The H level output is inverted to an L level via the inverter 93 and is then supplied to the other input terminal of the AND gate 35. Therefore, the AND gate 35 produces an L level output either with the lens of a focal length greater than 85 mm or the lens of a minimum aperture value smaller than F 22 mounted on the camera. Then, the output of the AND gate 35 is supplied to the AND gates 37 and 38 putting the outputs of these AND gates 37 and 38 at L levels. Meanwhile, the output of the AND gate 35 is also inverted by the inverter 40 and is then supplied to the AND gate 36. In the meantime, since the reference pulses from the pulse generator 13 are impressed on the terminal CLK of the counter 27', the output Q of the counter 27' is repeatedly changing between an H level and an L level in a predetermined cycle. The output Q of the counter 27' is impressed on one of the input terminals of the AND gate 36. As a result, the wave form of the AND gate 36 becomes identical with that of the output Q of the counter 27'. The signal of this wave form thus obtained is also impressed on the driving circuit 41 via the OR gate 32. Therefore, the displays 2a of FIG. 1 and 22'a of FIG. 2 flicker giving warning to the photographer that, although the program line A of FIG. 3 is selected, the lens in use is unsuited for taking a good picture.

In case of a lens of a focal length less than 85 mm and of a minimum aperture exceeding F 22, the AND gate 35 produces an H level output. In this instance, if a voltage (hereinafter called the voltage VTV), which corresponds to the shutter speed and is produced from the program line selection circuit, is higher than a voltage corresponding to a shutter speed value TV of 1/15 sec., the comparator CP6 produces an H level output. The output level of the AND gate 37 becomes an H level. The H level output actuates the driving circuit 42 via the OR gate 41. The displays 2a of FIG. 1 and 22'a of FIG. 2 light up informing the photographer that the program line A of FIG. 3 has been selected. If the voltage VTV is lower than the shutter speed TV of 1/15 sec., the comparator CP6 produces an L level output. The output level of the inverter 39 becomes an H level and the wave form of the output of the AND gate 38 becomes the same as that of the output Q of the counter 27. The signal thus produced from the AND gate 38 is transmitted via the OR gate 41 to the driving circuit 42. The displays 2a of FIG. 1 and 22'a of FIG. 2 then flicker.

The counters 27 and 27' are inverting their output levels in different cycles, as mentioned in the foregoing. Therefore, the display flicker caused by the counter 27 or 27' tells the photographer whether the flickering display indicates the use of an unsuited lens or an inapposite external light quantity.

Then, when the switch 17 is again turned on for a brief period of time, the program line selection circuit 69 becomes operative and selects the program line B of FIG. 3. Then, if the maximum aperture F-number and the minimum aperture value of the lens are of the same value, i.e. if the lens is of a fixed aperture, the comparator 76 produces an L level output. The displays 2b of FIG. 1 and 22'b of FIG. 2. flicker at the frequency of the counter 27'. If the lens is not of a fixed aperture, the comparator 76 produces an H level output. In this instance, if the shutter speed is higher than 1/500 sec., the displays 2b and 22'b light up. Deviation from the above range causes the displays 2b and 22'b to flicker at the frequency of the counter 27.

When the switch 17 is further turned on for a brief period of time, the program line selection circuit 70 operates. The program line C of FIG. 3 is selected. If the lens in use is of a fixed aperture in that instance, the displays 2c of FIG. 1 and 22'c of FIG. 2 make a flickering display at the frequency of the counter 27'. If the lens is not of a fixed aperture and if the shutter speed is in a range between 1/8 and 1/30 sec., the displays 2c and 22'c light up. If the shutter speed is not within the range, the displays 2c and 22'c flicker at the frequency of the counter 27.

When the switch 17 is turned on once more for a brief period of time, the program line selection circuit 71 selects the program line D of FIG. 3. In this instance, if the lens mounted on the camera is of a focal length less than 50 mm or of a maximum F-number greater than F 2.8, the displays 2d of FIG. 1 and 22'd of FIG. 2 make a flickering display at the frequency of the counter 27'. If the lens is of a focal length longer than 50 mm and of the maximum F-number less than F 2.8, the displays 2d and 22'd light up with the lens set at an F-number less than F 2.8 and the shutter speed set at a speed higher than 1/15 sec. The displays 2d and 22'd flicker at the frequency of the counter 27 under any condition that deviates from the above.

When the switch 17 is once again turned on for a brief period of time, the program line selection circuit 67 is once more selected and the camera returns to its initial state of having the power source switched on.

The foregoing describes the operation of the camera, performed with the switch 17 turned on for a brief period of time. However, when the switch 17 is turned on and kept on, the H level of the output Q of one of the group of the flip-flops 21–25 shifts, as mentioned in the foresoing, in the sequence of the flip-flops 21→22→23→24→25→21→. Then, the program line selection circuits 67–71 are selected, one after another. The displays light up or flicker according to the conditions of the lens and the light quantity. The display driving circuits 33–66 are also selected one after another. Accordingly, the operation of the display elements connected to these driving circuits 33–66 also shifts in the sequence of 2a→2e of FIG. 1 and 22'a→22'e of FIG. 2. The shifting display enables the photographer to select a desired program line by turning off the switch 17 when a display corresponding to the desired program line lights up or flickers. Then, exposure is performed at a shutter speed value T and an aperture value F-NO. depending on the value EV of the program line.

In the latter embodiment, combinations of aperture values and shutter speeds required for deriving various picture image effects are programmed beforehand enabling even a beginning photographer to obtain desired effects; these effects are displayed within or outside of the view finder by simplified pictographs or letters or the like; and the display also gives a warning as to whether the maximum and minimum aperture values or a fixed aperture value and the focal length of the lens in use are apposite for the programed exposure control mode. The display thus facilitates selection of one of the exposure control modes required for obtaining one of the various desired picture image effects. Photography is an act of a human being for imparting a desired image to a machine. A camera is required to facilitate the act. Although it is impossible to obtain a 100 percent desired picture image effect, it is desirable to use as much information as possible relative to the condition of the object to be photographed and that of the lens to be used. In the embodiment, the programs are prearranged to include the aperture-and-shutter speed combinations which are used most frequently according to past experiences. In addition, the display gives a warning in the event that a selected exposure control mode program deviates, enabling even a beginner to take a good picture.

What we claim:
1. A control device of a camera, comprising:
   (a) plurality of discontinuous program lines having a combination of a shutter time and an aperture value determined by object brightnesses, said plurality of discontinuous program lines having different picture image effects obtainable from respective program lines;
   (b) selecting means for selecting one program line out of said plurality of program lines, said means being able to select said one program line by operation from outside;
   (c) display means for displaying the selected program line, said means displaying the picture image effect obtainable by said selected program line in pictographs and/or letters;
   (d) signal generating means for generating an electrical signal corresponding to photographing information;
   (e) means for determining whether the picture image effect to be derived from the selected program line is obtainable or not on the basis of the electrical signal from said signal generating means;
   (f) means for forcibly varying a selected program line to another program line in said plurality of discontinuous program lines, said varying means being arranged to become operative when said determining means determines that the picture image effect is not obtainable; and
   (g) display control means for controlling a display operation of said display means by an output of said determining means, said display control means varying a display state of said display means when said determining means determines that the picture image effect cannot be obtained, wherein said control means forces said display means to flicker at a first or second frequency, said flickering at the first frequency being forced when the picture image effect is not obtainable due to a photographing information of the photographing lens, while said flickering at the second frequency is forced when the picture image effect is not obtainable due to an object brightness information.

2. A control device of a camera, comprising:
   (a) a plurality of discontinuous program lines having a combination of a shutter time and an aperture value determined by object brightnesses, said plurality of discontinuous program lines having different picture image effects obtainable from respective program lines;
   (b) selecting means for selecting one program line out of said plurality of program lines, said means being able to select said one program line by operation from outside;
   (c) display means for displaying the selected program line, said means displaying the picture image effect obtainable by said selected program line in pictographs and/or letters;
   (d) signal generating means for generating an electrical signal corresponding to photographing information;
   (e) means for determining whether the picture image effect to be derived from the selected program line is obtainable or not on the basis of the electrical signal from said signal generating means;
   (f) means for forcibly varying a selected program line to another program line in said plurality of discontinuous program lines, said varying means being arranged to become operative when said determining means determines that the picture image effect is not obtainable; and
   (g) display control means for controlling a display operation of said display means by an output of said determining means, said display control means varying a display state of said display means when said determining means determines that the picture image effect cannot be obtained, wherein said display control means controls changes in the display state of said display means differently when picture image effect is not obtainable due to photographic information and when the picture image effect is not obtainable due to an object brightness information.

3. A control device of a camera, comprising:
   (a) a plurality of program lines having a combination of a shutter time and an aperture value determined against object brightnesses, said plurality of program lines including a first program line mainly composed of a program line portion for maintaining a predetermined aperture value almost constant against changes in object brightness, and said first program line providing a picture image effect for obtaining an almost constant focal depth against changes in object brightness;
   (b) selecting means for selecting one program line out of said plurality of program lines, with at least said first program line being selectable by exterior operation;
   (c) first display means for displaying the selected said first program line, said means displaying the picture image effect obtainable by said selected first program line in pictographs and/or letters;
   (d) signal generating means for generating an electrical signal corresponding to photographing information;
   (e) means for determining whether the picture image effect to be derived from the selected said first program line is obtainable or not on the basis of the electrical signal from said signal generating means; and
   (f) second display means for displaying by an output of said determining means, said second display means displaying when said determining means determines that the picture image effect cannot be obtained, wherein said second display means performs different displays when the picture image effect is not obtainable due to a photographic information and when the picture image effect is not obtainable due to an object brightness information.

4. A control device of a camera, comprising:
   (a) a plurality of discontinuous program lines having a combination of a shutter time and an aperture value determined by object brightnesses, said plurality of discontinuous program lines having different picture image effects obtainable from respective program lines;
   (b) selecting means for selecting one program line out of said plurality of program lines, said means being able to select said one program line by operation from outside;
   (c) signal generating means for generating an electrical signal corresponding to a photographing lens information;

(d) means for determining whether the picture image effect to be derived from the selected program line is obtainable or not on the basis of the electrical signal from said signal generating means; and
(e) means for forcibly varying a selected program line to another program line in said plurality of discontinuous program lines, said varying means being arranged to become operative when said determining means determines that the picture image effect is not obtainable, wherein, for use as said photographing lens information, a minimum aperture value information is used.

5. A control device of a camera, comprising:
(a) a plurality of discontinuous program lines having a combination of a shutter time and an aperture value determined by object brightnesses, said plurality of discontinuous program lines having different picture image effects obtainable from respective program lines;
(b) selecting means for selecting one program line out of said plurality of program lines, said means being able to select said one program line by operation from outside;
(c) signal generating means for generating an electrical signal corresponding to a photographing lens information;
(d) means for determining whether the picture image effect to be derived from the selected program line is obtainable or not on the basis of the electrical signal from said signal generating means; and
(e) means for forcibly varying a selected program line to another program line in said plurality of discontinuous program lines, said varying means being arranged to become operative when said determining means determines that the picture image effect is not obtainable, wherein, for use as said photographing lens information, a focal length information is used.

6. A control device of a camera, comprising:
(a) a plurality of discontinuous program lines having a combination of a shutter time and an aperture value determined against object brightnesses, said plurality of discontinous program lines including:
  (1) a first program line mainly composed of a program line portion for maintaining a predetermined aperture value almost constant against changes in object brightness, said first program line providing a picture image effect for obtaining an almost constant focal depth against changes in object brightness;
  (2) a second program line mainly composed of a program line portion for changing both of the aperture value and the shutter time value against the change of the object brightness;
  (3) said first program line and said second program line being discontinuous;
(b) selecting means for selecting one program line out of said plurality of discontinuous program lines, with at least said first program line being selectable by exterior operation;
(c) signal generating means for generating an electrical signal corresponding to photographing information;
(d) means for determining whether the picture image effect to be derived from the selected first program line is obtainable or not on the basis of the electrical signal from said signal generating means; and
(e) means for forcibly varying the selected first program line to said second program line, said varying means being arranged to become operative when said determining means determines that the picture image effect is not obtainable.

7. A control device of a camera, comprising:
(a) a plurality of discontinuous program lines having a combination of a shutter time and an aperture value determined against object brightnesses, said plurality of discontinuous program lines including:
  (1) a first program line composed mainly of a program line portion for maintaining a predetermined shutter time almost constant against changes in the object brightness, said first program line providing a picture image effect for obtaining an almost constant shutter time against changes in object brightness;
  (2) a second program line mainly composed of a program line portion for changing both of the aperture value and the shutter time value against the change of the object brightness;
  (3) said first program line and said second program line being discontinuous;
(b) selecting means for selecting one program line out of said plurality of discontinuous program lines, with at least said first program line being selectable by exterior operation;
(c) signal generating means for generating an electrical signal corresponding to photographing information;
(d) means for determining whether the picture image effect to be derived from the selected first program line is obtainable or not on the basis of the electrical signal from said signal generating means; and
(e) means for forcibly varying the selected first program line to said second program line, said varying means being arranged to become operative when said determining means determines that the picture image effect is not obtainable.

8. A control device according to claim 6, further comprising:
display means for displaying by an output of said determining means, said display means displaying when said determining means determines that the picture image effect cannot be obtained.

9. A control device according to claim 7, further comprising:
display means for displaying by an output of said determining means, said display means displaying when said determining means determines that the picture image effect cannot be obtained.

10. A control device according to claim 6, wherein said photographing information of said signal generating means includes information of variable aperture value of the photographing lens.

11. A control device according to claim 7, wherein said photographing information of said signal generating means includes information of variable aperture value of the photographic lines.

12. A control device according to claim 6, wherein said photographing information of said signal generating means includes information of brightness of an object.

13. A control device according to claim 7, wherein said photographing information of said signal generating means includes information of brightness of an object.

* * * * *